United States Patent
Liu et al.

(10) Patent No.: US 11,419,198 B2
(45) Date of Patent: Aug. 16, 2022

(54) LIGHT SENSOR AND CONTROL METHOD THEREOF

(71) Applicant: SENSORTEK TECHNOLOGY CORP., Zhubei (TW)

(72) Inventors: Cheng-Feng Liu, Zhubei (TW); Meng-Yong Lin, Zhubei (TW)

(73) Assignee: Sensortek Technology Corp., Jhubei (TW)

( * ) Notice: Subject to any disclaimer, the term of this patent is extended or adjusted under 35 U.S.C. 154(b) by 0 days.

(21) Appl. No.: 17/025,271

(22) Filed: Sep. 18, 2020

(65) Prior Publication Data

US 2021/0282246 A1    Sep. 9, 2021

Related U.S. Application Data (60) Provisional application No. 62/902,952, filed on Sep. 19, 2019.

(51) Int. Cl.
*H05B 47/11*    (2020.01)
*H05B 47/115*    (2020.01)

(52) U.S. Cl.
CPC .......... *H05B 47/115* (2020.01); *H05B 47/11* (2020.01)

(58) Field of Classification Search
CPC ........ H05B 45/00; H05B 47/10; H05B 47/11; H05B 47/115; G09G 3/00
See application file for complete search history.

(56) References Cited

U.S. PATENT DOCUMENTS

| | | | |
|---|---|---|---|
| 9,479,736 B1 | 10/2016 | Karakotsios | |
| 2013/0063042 A1* | 3/2013 | Bora | H05B 45/20 315/292 |
| 2016/0366746 A1* | 12/2016 | van de Ven | H05B 45/20 |

FOREIGN PATENT DOCUMENTS

| | | |
|---|---|---|
| TW | 201843480 A | 12/2018 |
| TW | 201843617 A | 12/2018 |

OTHER PUBLICATIONS

International Office Action Issued By Foreign Patent Office in Application No. 11020581980/109132223 (Part 1).
International Office Action Issued By Foreign Patent Office in Application No. 11020581980/109132223 (Part 2).

* cited by examiner

*Primary Examiner* — Jimmy T Vu
(74) *Attorney, Agent, or Firm* — Rosenberg, Klein & Lee (57) ABSTRACT

A light sensor and control method thereof, which controls the light sensor comprising a first light emitted element, a second light emitted element, a first light sensing element and a control circuit. The light wavelength of the second light emitted element is greater than the light wavelength of the first light emitted element. The control circuit is coupled to the first and second light elements and the first light sensing element. When the display of an electronic device is in a light-up status, the control circuit switches on the first light emitted element to emit light; when the display of the electronic device is in a light-off status, the control circuit switches on the second light emitted element to emit light. Thus, it will prevent from the influence to the image of the display, and obtained the better sensing ability.

10 Claims, 14 Drawing Sheets

LIGHT SENSOR AND CONTROL METHOD THEREOF

FIELD OF THE INVENTION

The present application relates to a light sensor, in particular the light sensor that can dynamically select the light-emitting units and light-sensing units.

BACKGROUND OF THE INVENTION

Light sensors, which perform light through sensing technology, are widely used in many applications; for example, the proximity sensor can measure the distance between user's face and the display of an electronic device (for example, smart phone). Once the proximity sensor approaches user's face, the device will shut off the display and its touch-control function, avoiding user's face from touching the display and interrupting the call made thereof.

Generally speaking, while a proximity sensor is applied in an electronic device, it needs to open a hole on top of the proximity sensor to have the light emitted by a light-emitting diode (LED) to pass through, and measure the distance between it and the object via the light intensity. Yet, under outer appearance consideration, the current smart phones gradually follow the trend of high screen duty ratio and even full screen application, the proximity sensor is forced to adopt the under-display design and is equipped behind the display screen.

Figure 1A:
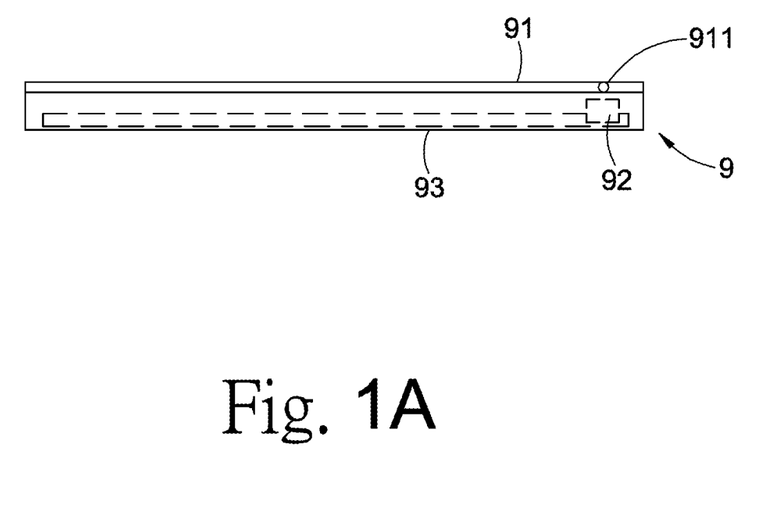
FIG. 1A: which is a sectional view of an electronic device.
Figure 1B:
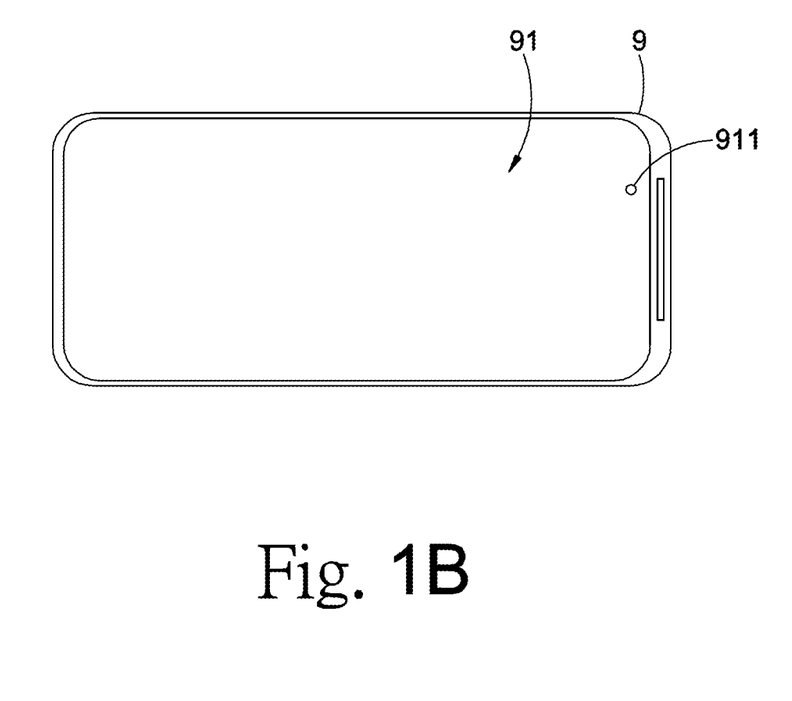
FIG. 1B: which is a top view of an electronic device.

FIG. 1A and FIG. 1B are the section view and top view of device 9; device 9 is built by a display screen 91, a light sensor 92 and a main board 93. The light sensor 92 is under-display design and equipped between display screen 91 and main board 93 to make device under full-screen design without compressing the space of display screen 91 to put in the light sensor 92. When the light sensor is a proximity sensor, it normally has an 850~1000 nm infrared RED emitting light beam to go through the display screen 91, and measure the distance between display screen 91 and the object appearing before it via the intensity of reflective light. Yet, while the display screen 91 is at screen-on status, the 850~1000 nm infrared light may impact the imaging of display screen 91 (for example, forming a bright spot 911) and even cause irreversible damage to display screen 91.

Accordingly, it is necessary to improve the existing light sensors installed behind the display screen.

SUMMARY

An objective of the present application is to provide a kind of light sensor and its control method; the light-emitting unit contains a first light-emitting unit and a second light-emitting unit. By setting the light-emitting unit with two light wavelengths, it can solve the problem that while lighting on screen, specific light wavelength passing through the screen may impact the imaging of display screen and even cause irreversible damage to display screen. Meanwhile, while the screen is not on, it still uses light with specific light wavelength to measure distance and obtain better sensitivity.

The present application refers to a kind of light sensor and its control method; the control method controls light sensors containing a first light-emitting unit, a second light-emitting unit, a first light-sensing unit, a second light-sensing unit and a control circuit. The light wavelength of first light-emitting unit is longer that the second light-emitting unit. The control circuit couples with the first light-emitting unit, second light-emitting unit and first light-sensing unit. While the display screen of an electronic device is at screen-on status, the control circuit activates the first light-emitting unit; while the display screen is at light-off status, the control circuit activates the second light-emitting unit.

DETAILED DESCRIPTION

Some words are used to refer to specific elements in the descriptions and Claims. However, persons with general knowledge in the technical field of the present application should understand that the manufacturer may use different names to refer to the same element. Moreover, the descriptions and Claims do not use the name difference as a way to distinguish components, but will take the differences in overall technology of components as the distinction criteria. "Including" mentioned in the entire Invention Description and the Claim items is an "open" term, it should be interpreted as "including but not limited to". Furthermore, the term "coupled to" includes any direct and indirect means of connection. Therefore, if a first device is described to be coupled to a second device, it means that the first device can be directly or indirectly connected to the second device through other devices or other means of connections.

Figure 2:
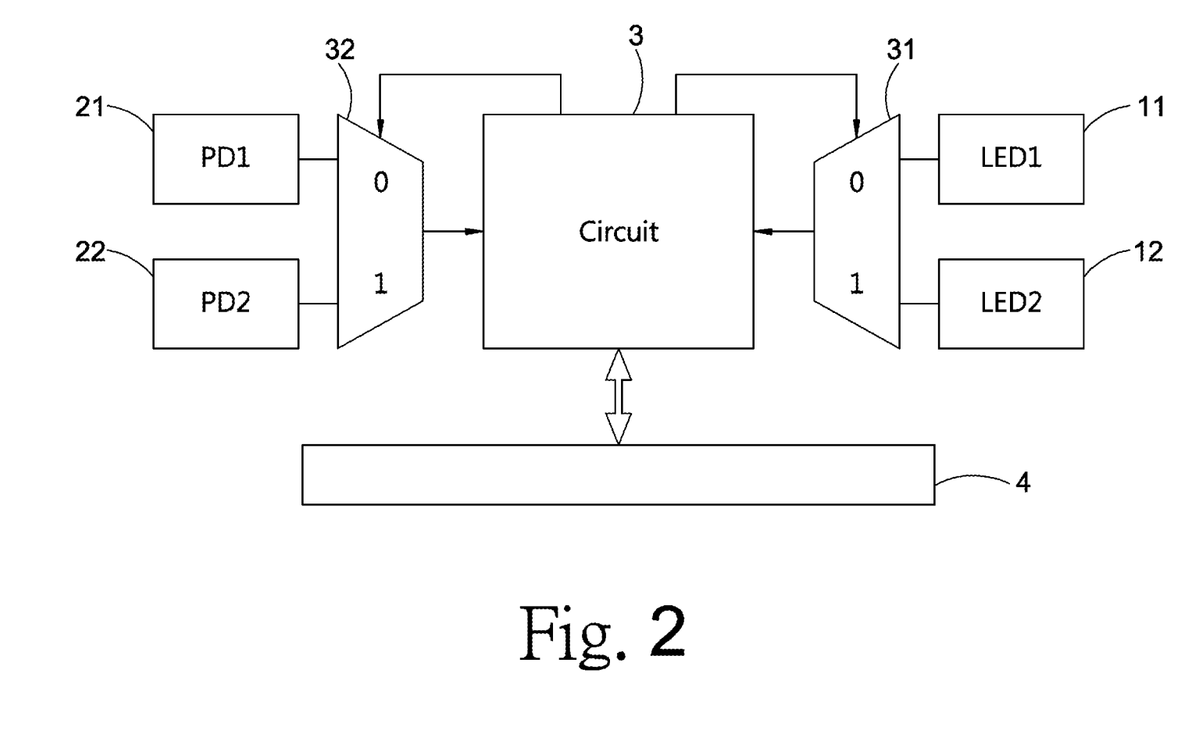
FIG. 2: which is illustrated with a configuration of one light sensor embodiment in the present application.

Refer to FIG. 2; which is an embodiment framework a light sensor in the present application. The light sensor comprises a first light-emitting unit 11, a second light-emitting unit 12, a first light-sensing unit 21, a second light-sensing unit 22 and a control circuit 3. The control circuit 3 couples to the first light-emitting unit 11, second light-emitting unit 12, first light-sensing unit 21 and second light-sensing unit 22, used to selectively activate one light-emitting unit and the respective light-sensing unit.

In a more detailed manner, in this embodiment, the first light-emitting unit 11 is a LED with a wavelength within the primary wavelength range: 1000~1600 nm (for example: 1300 nm); the second light-emitting unit 12 is a LED with a wavelength within the secondary wavelength range: 850~1000 nm (for example: 940 nm); the light wavelength of first light-emitting unit 11 is longer than the light wavelength of second light-emitting unit 12. The first light-sensing unit 21 is a photodiode with light-sensing feature corresponds to the primary wavelength range; the second light-sensing unit 22 is a photodiode with light-sensing feature corresponds to the secondary wavelength range. The control circuit 3 can couple with both the first light-emitting unit 11 and second light-emitting unit 12 through a data selector 31, which can selectively activate the primary or second light-emitting unit 11 or 12. Similarly, the control circuit 3 can couple with both the first light-sensing unit 21 and second light-sensing unit 22 through the other data selector 32, which can selectively activate the first or second light-sensing unit 21 or 22.

The light sensor in an embodiment of the present application is to be equipped in an electronic device; the control circuit 3 can transmit data through a data-transmission interface 4 in the electronic device; the data-transmission interface can be the main board of the electronic device (for example: smart phone). In this way, the control circuit 3 can receive data concerning whether or not the display screen of in the electronic device is at screen-on status.

Figure 3:
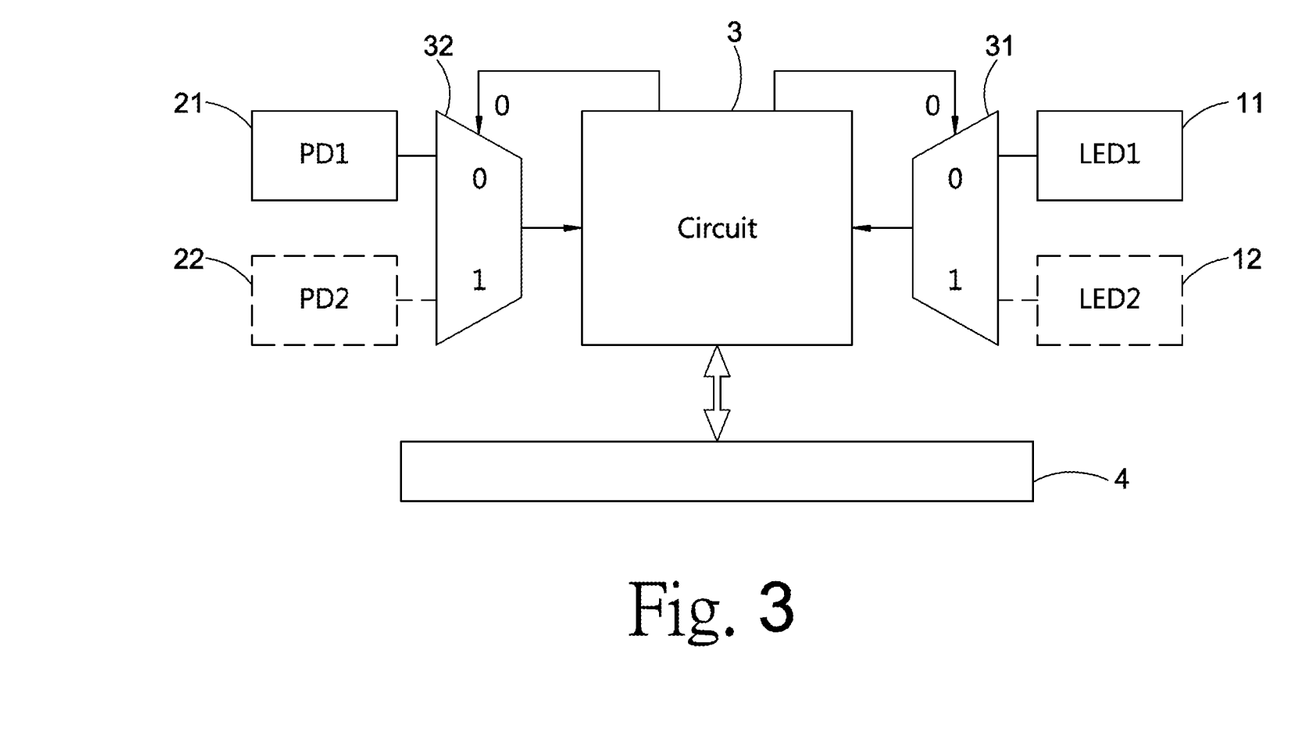
FIG. 3: which is an operating schematic diagram of one light sensor embodiment of the present application when the display screen at screen-on status.

In this way, refer to FIG. 3, while the display screen of electronic device is at screen-on status, the control circuit 3 will activate the first light-emitting unit 11 and have the light beam with the wavelength within the primary wavelength range passes through the display screen of electronic device, and measure the distance away from the object by means of the intensity of reflective light. Among that, the range of primary wavelength is within 1000~1600 nm (for example: 1300 nm), IR light within this wavelength won't affect the screen imaging and thus can avoid damaging the display screen. Meanwhile, the control circuit 3 can correspond to activate the first light-sensing unit 21 with the respective light-sensing feature and sense the reflective light.

Figure 4:
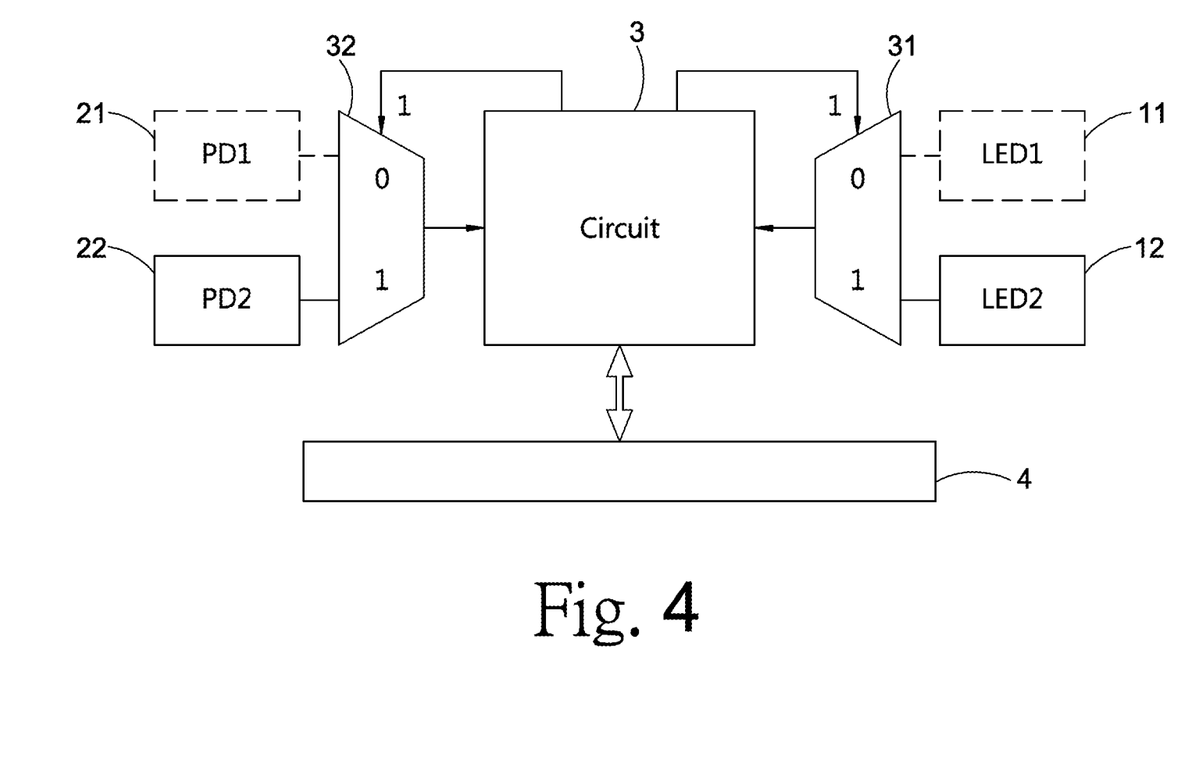
FIG. 4: which is an operating schematic diagram of one light sensor embodiment of the present application when the display screen at light-off status.
Figure 5:
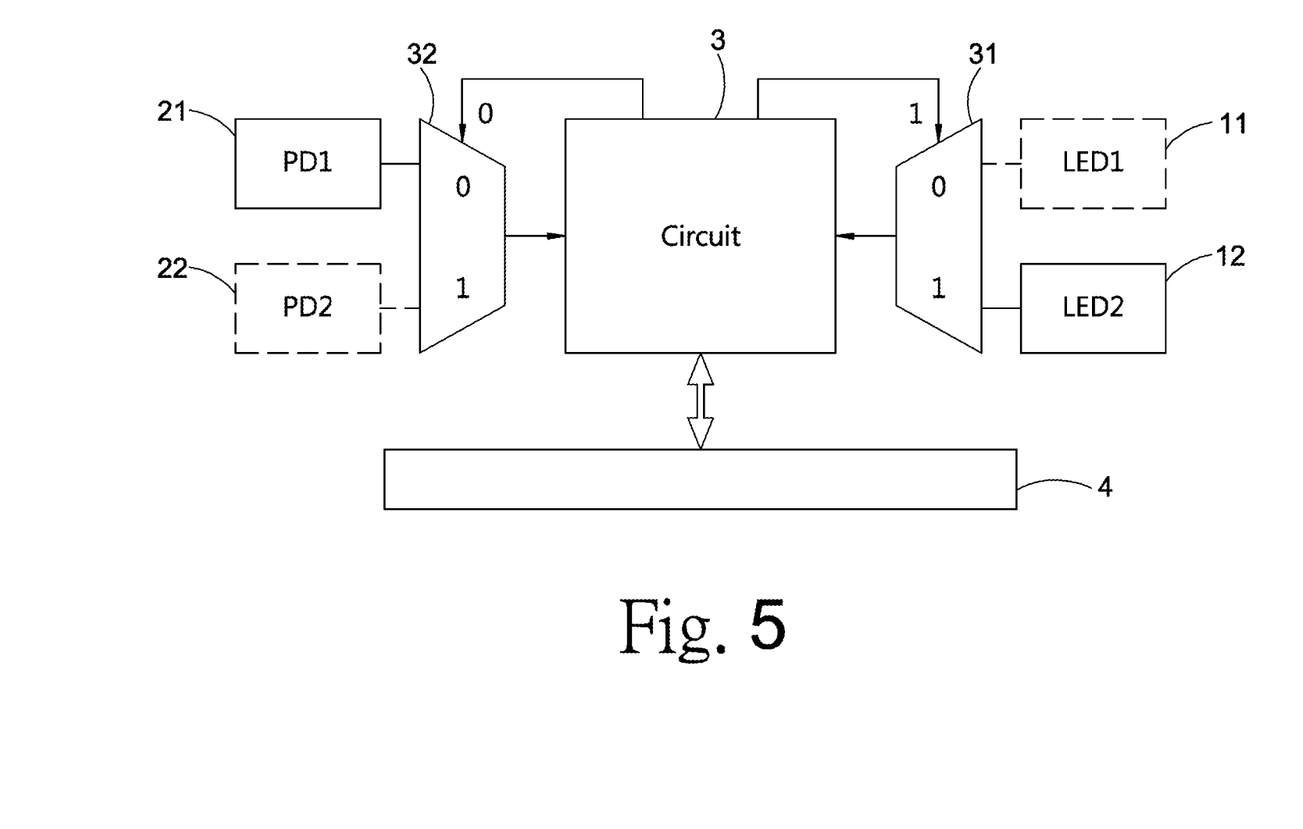
FIG. 5: which is an operating schematic diagram of the other light sensor embodiment of the present application when the display screen at light-off status.

Respectively, refer to FIG. 4 and FIG. 5, while the display screen of electronic device is at screen-off status, the control circuit 3 will activate the second light-emitting unit 12 and have the light beam with the wavelength within the secondary wavelength range passes through the display screen of electronic device, and measure the distance away from the object by means of the intensity of reflective light. Among that, the range of primary wavelength is within 850-1000 nm (for example: 940 nm), IR light within this wavelength will get better sensitivity. Since now the display screen is at screen-off status, it certainly won't affect the screen imaging and thus can avoid damaging the display screen. Meanwhile, the control circuit 3 can correspond to activate the second light-sensing unit 22 with the respective light-sensing feature and sense the reflective light.

Sum up the aforesaid statements, the light sensor and its control method shown in the embodiment of The present application use two light-emitting units with different light wavelengths to solve the problem that while at screen-on status, the light beam pass through the display screen with specific wavelength may affect the screen imaging (for example, forming a bright spot) or even cause irreversible damage to display screen. Meanwhile, while at screen-off status, the light sensor in the present application still can use the light beam with specific wavelength to sense and measure the distance and get better sensitivity.

In addition, although the first light-sensing unit 21 is a photodiode with light-sensing feature corresponds to the primary wavelength range, yet, since the light in the secondary wavelength range has a shorter wavelength and higher energy, actually, the first light-sensing unit 21 still can effectively sense the light in the secondary wavelength range. Therefore, in the embodiment of The present application, when the control circuit 3 activates the second light-emitting unit 22 to emit light beam with wavelength within the secondary wavelength range and penetrate the display screen of electronic device, it still can activate the first light-sensing unit 21 to sense the reflective light, and measure the distance between it and the object via the intensity of reflective light. In these embodiments, the second light-sensing unit 22 can be selectively ignored in the prospective of deducting the overall cost of light sensor.

Figure 6A:
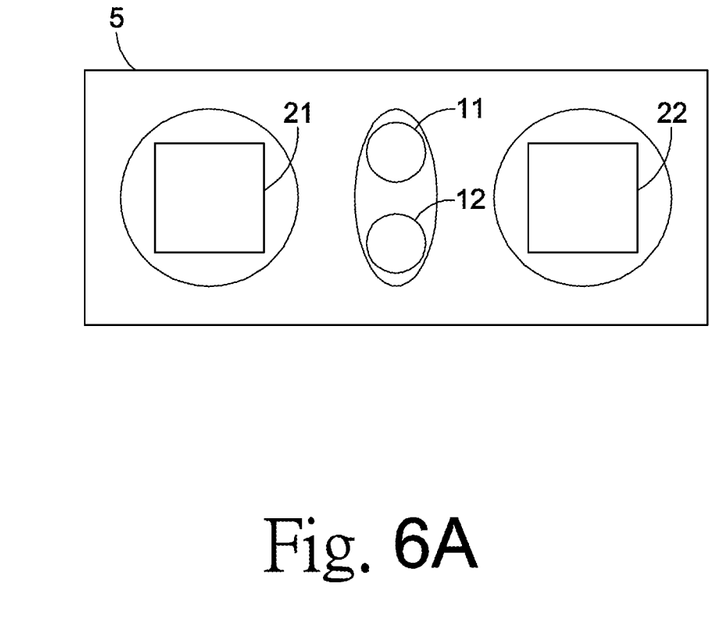
FIG. 6A: which is a packaging schematic diagram of one light sensor embodiment in the present application.
Figure 6B:
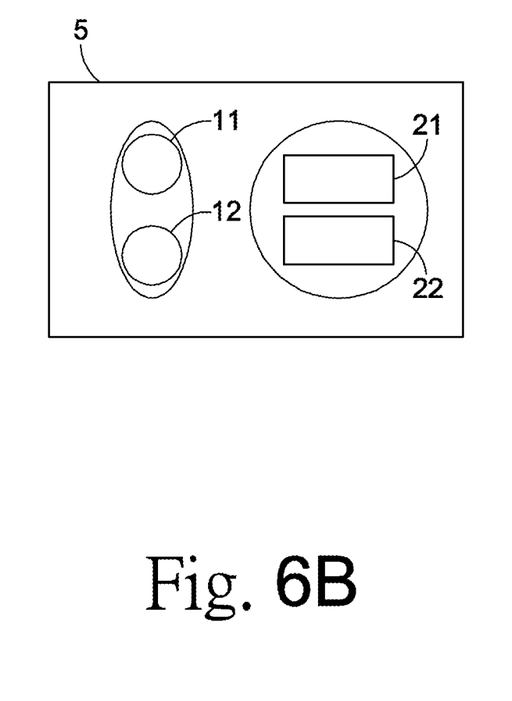
FIG. 6B: which is a packaging schematic diagram of one light sensor embodiment in the present application.
Figure 6C:
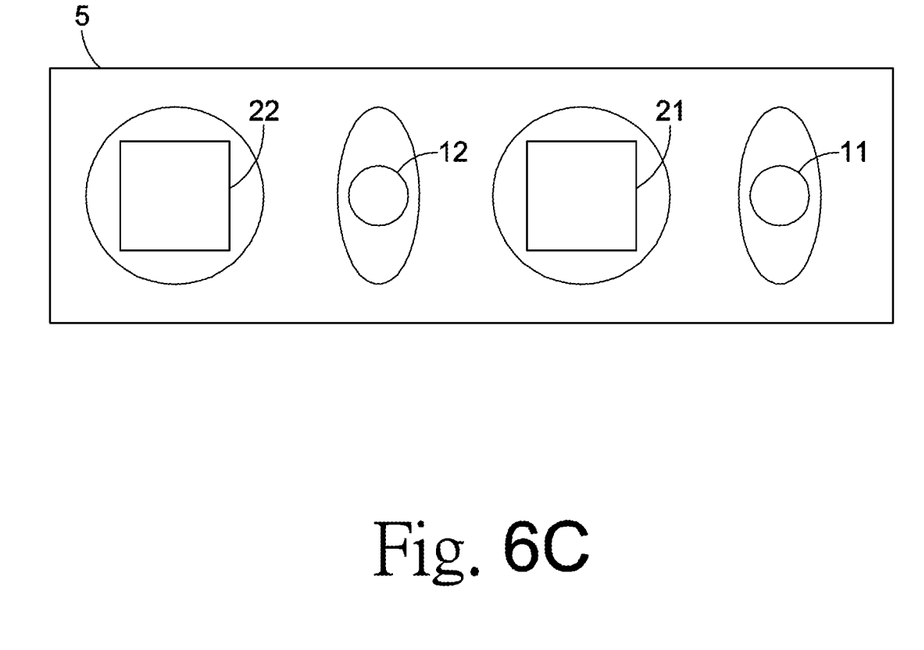
FIG. 6C: which is a packaging schematic diagram of one light sensor embodiment in the present application.

Refer to FIG. 6A~FIG. 6C, which is the packaging schematic diagram of light sensor in the embodiment of the present application, the first light-emitting unit 11, second light-emitting unit 12, first light-sensing unit 21 and second light-sensing unit 22 can be packed in a cover 5. The first light-emitting unit 11 and the second light-emitting unit 12 can be set next to each other to fix the light-emitting location of light sensor, as shown in FIG. 6A; the first light-sensing unit 21 and the second light-sensing unit 22 can be set at the other side of the first light-emitting unit 11 and the second light-emitting unit 12; or, as shown in FIG. 6B, set the first light-sensing unit 21 and the second light-sensing unit 22 at the same side of the first light-emitting unit 11 and the second light-emitting unit 12. Or, set the first light-emitting unit 11 and the second light-emitting unit 12 separately as shown in FIG. 6C, in which the first light-emitting unit 11, first light-sensing unit 21, second light-emitting unit 12 and second light-sensing unit 22 are set in a cross-over arrangement.

Figure 7A:
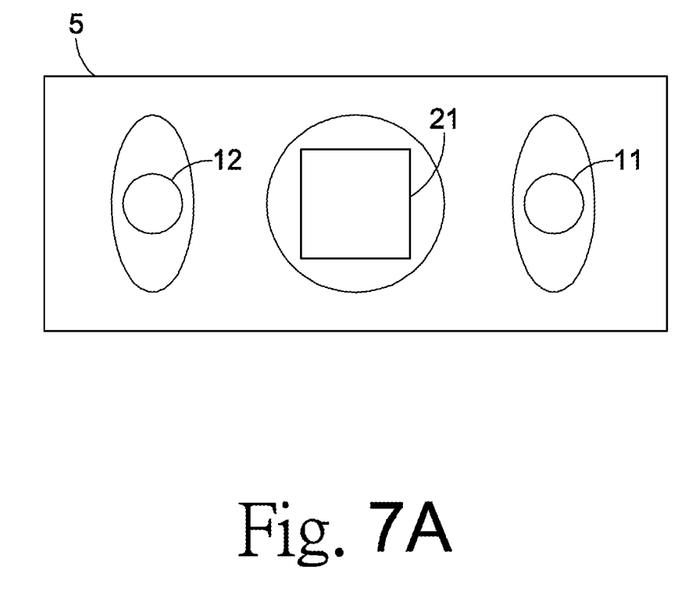
FIG. 7A: which is a packaging schematic diagram of the other light sensor embodiment in the present application.
Figure 7B:
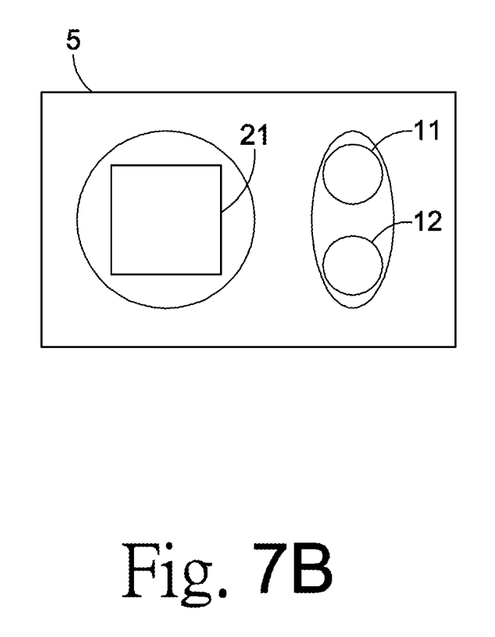
FIG. 7B: which is a packaging schematic diagram of the other light sensor embodiment in the present application.

As illustrated above, in the embodiment of the present application, the second light-sensing unit 22 can be selectively ignored. From this, refer to FIG. 7A, the first light-emitting unit 11 and second light-emitting unit 12 can be set at the other side of the first light-sensing unit 21. Or, as shown in FIG. 7B, the first light-emitting unit 11 and second light-emitting unit 12 can be set next to each other and at the same side of the first light-sensing unit 21 to fix the light-emitting location of light sensor.

Figure 8A:
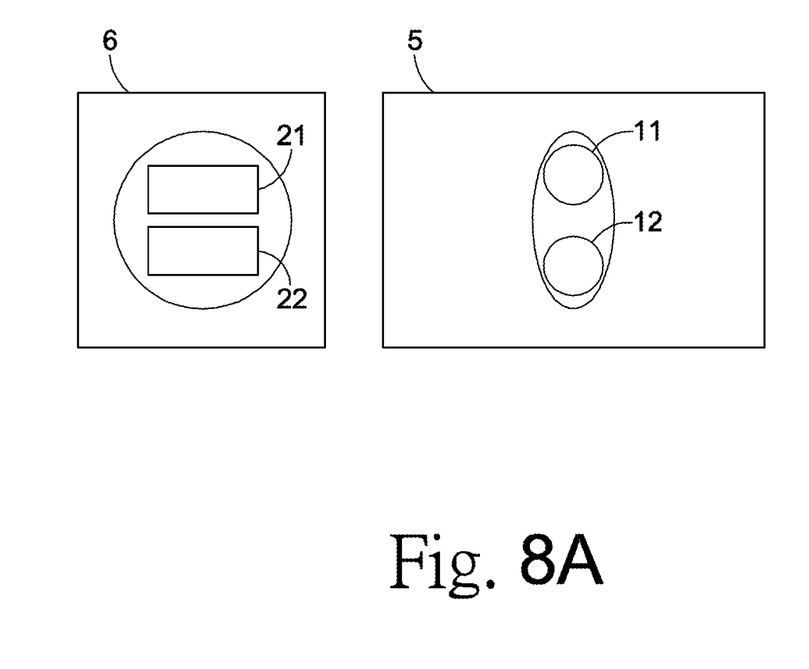
FIG. 8A: which is a packaging schematic diagram of one embodiment with multi-module light sensor.
Figure 8B:
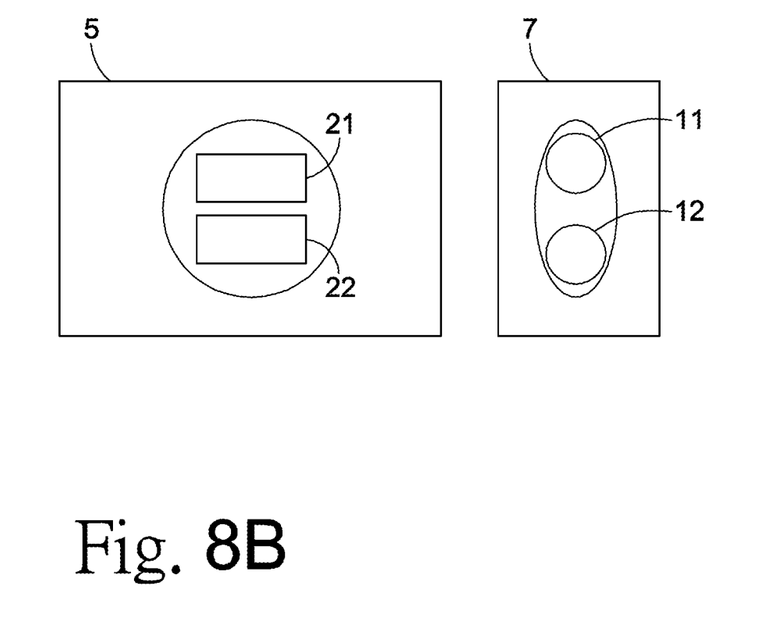
FIG. 8B: which is a packaging schematic diagram of one embodiment with multi-module light sensor.
Figure 8C:
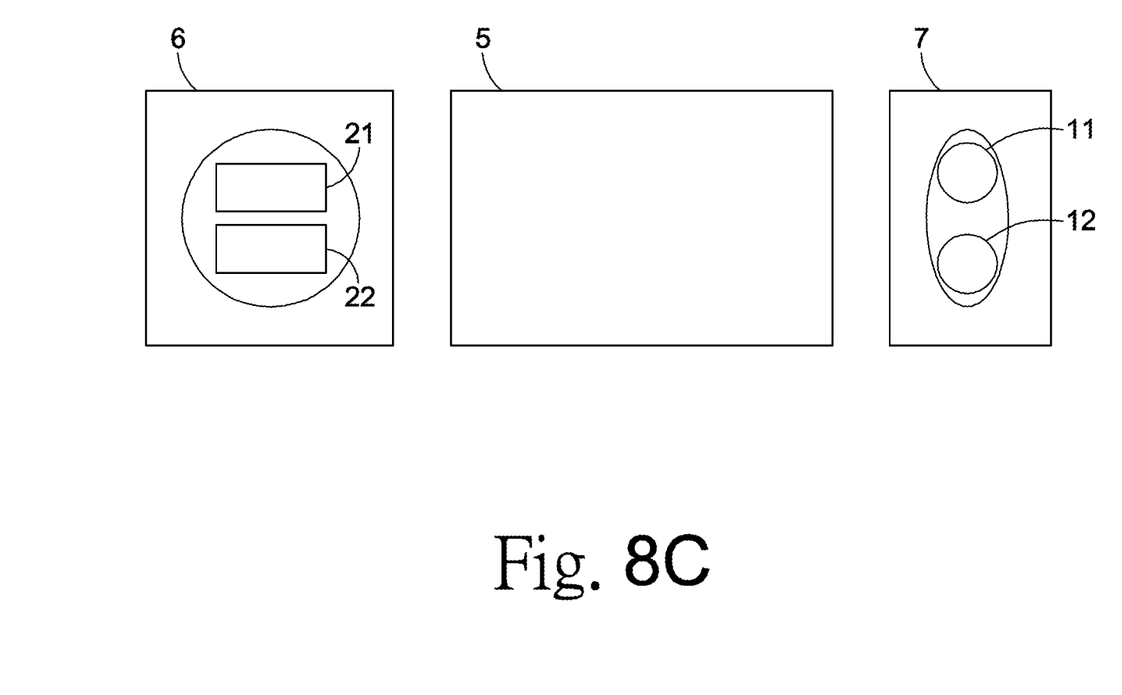
FIG. 8C: which is a packaging schematic diagram of one embodiment with multi-module light sensor.

Based on that in the embodiment of the present application, the light sensor needs to equip a few light-emitting units and selectively set a few light-sensing units; actually, the light-emitting units and light-sensing units do not necessarily need to be packed in one module. Refer to FIG. 8A~FIG. 8C, which is the packaging schematic diagram of light sensor on the embodiment of the present application. As shown in FIG. 8A, the first light-emitting unit 11 and second light-emitting unit 12 can be packed in a main cover 5, and the control circuit is also packed inside the cover; the first light-sensing unit 21 and second light-sensing unit 22 can be packed in a sub cover 6 which is set at the same side of cover 5. On the other hand, as shown in FIG. 8B, the first light-sensing unit 21 and second light-sensing unit 22 can be packed in a main cover 5, whereas the first light-emitting unit 11 and second light-emitting unit 12 packed in a sub cover 6 set at the same side of main cover 5. Or as shown in FIG. 8C, the main cover 5 is free from the first light-emitting unit 11, second light-emitting unit 12, first light-sensing unit 21 and second light-sensing unit 22 inside it; in which the first light-emitting unit 11 and second light-emitting unit 12 can be packed in a sub cover 6 set at the same side of the main cover 5, and the first light-sensing unit 21 and second light-sensing unit 22 can be packed inside another sub cover 7 set at the other side of the main cover 5.

The invention claimed is:

1. A light sensor, for setting in an electronic device with a display screen, comprising:
    a first light-emitting unit;
    a second light-emitting unit, wherein a light wavelength emitted from the first light-emitting unit is longer than a light wavelength emitted from the second light-emitting unit;
    a first light-sensing unit; and
    a control circuit, coupled to the first light-emitting unit, the second light-emitting unit and the first light-sensing unit;
    wherein when the display screen of the electronic device is at a screen-on status, the control circuit activates the first light-emitting unit to emit light; when the display screen of the electronic device is at a screen-off status, the control circuit activates the second light-emitting unit to emit light.

2. The light sensor of claim 1, wherein the light wavelength emitted from the first light-emitting unit is within a primary wavelength range, the primary wavelength range is within 1000-1600 nm; the light wavelength emitted from the second light-emitting unit is within a secondary wavelength range, the secondary wavelength range is within 850-1000 nm.

3. The light sensor of claim 2, wherein the first light-sensing unit is a photodiode with light-sensing feature corresponding to the primary wavelength range.

4. The light sensor of claim 2, further comprising a second light-sensing unit, when the control circuit activates the first light-emitting unit to emit light, the control circuit also activates the first light-sensing unit to sense a reflective light; when the control circuit activates the second light-emitting unit, the control circuit also activates the second light-sensing unit to sense the reflective light.

5. The light sensor of claim 4, wherein the first light-sensing unit is the photodiodes with light-sensing feature corresponding to the primary wavelength range, and the second light-sensing unit is the photodiodes with light-sensing feature corresponding to the secondary wavelength range.

6. The light sensor of claim 1, in which the light sensor is equipped behind the display screen in the electronic device.

7. A control method for a light sensor, which controls the light sensor with a first light-emitting unit, a second light-emitting unit and a first light-sensing unit, including:
    using a control circuit to receive a status data of whether a display screen of electronic device is at a screen-on status or not;
    when the display screen of electronic device is at screen-on status, the control circuit activates the first light-emitting unit to emit light;
    when the display screen of electronic device is at screen-off status, the control circuit activates the second light-emitting unit to emit light, wherein the light wavelength emitted from the first light-emitting unit is longer than the light wavelength emitted from the second light-emitting unit.

8. The control method for the light sensor of claim 7, further includes: the control circuit activates the first light-sensing unit to sense a reflective light.

9. The control method for the light sensor of claim 7, in which the wavelength emitted by the first light-emitting unit lies within a primary wavelength range of 1000~1600 nm; the wavelength emitted by the second light-emitting unit lies within a secondary wavelength range of 850~1000 nm.

10. The control method for the light sensor of claim 9, in which the light sensor further includes a second light-sensing unit, a light-sensing feature of the first light-sensing unit corresponds to the primary wavelength range and a light-sensing feature of the second light-sensing unit corresponds to the secondary wavelength range; when the control circuit activates the first light-emitting unit to emit light, the control circuit also activates the first light-sensing unit to sense the reflective light; when the control circuit activates the second light-emitting unit to emit light, the control circuit also activates the second light-sensing unit to sense the reflective light.

\* \* \* \* \*